United States Patent
Small

(10) Patent No.: US 7,257,327 B2
(45) Date of Patent: *Aug. 14, 2007

(54) WIRELESS COMMUNICATION SYSTEM WITH HIGH EFFICIENCY/HIGH POWER OPTICAL SOURCE

(75) Inventor: James G. Small, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 646 days.

This patent is subject to a terminal disclaimer.

(21) Appl. No.: 10/231,651

(22) Filed: Aug. 30, 2002

(65) Prior Publication Data

US 2003/0016421 A1   Jan. 23, 2003

Related U.S. Application Data

(63) Continuation-in-part of application No. 09/798,623, filed on Mar. 1, 2001, now Pat. No. 6,504,303, which is a continuation-in-part of application No. 09/584,887, filed on Jun. 1, 2000, now Pat. No. 6,373,194.

(51) Int. Cl.
 *H04B 10/00* (2006.01)
(52) U.S. Cl. .............. 398/118; 398/115; 398/116; 398/117; 398/119; 398/120; 398/124; 398/125; 398/128; 398/129; 398/130; 398/133; 398/134; 398/182; 398/183; 398/135; 398/136; 398/139; 398/70; 398/71; 398/72; 398/66; 398/67; 398/68; 398/121; 398/122; 398/123; 315/39.51; 315/39.77; 315/39.75; 315/39.65; 315/39.69; 315/39.73
(58) Field of Classification Search ........ 398/118–134, 398/115, 116, 117, 135, 139, 136, 182, 183, 398/70, 71, 72, 66, 67, 68; 315/39.77, 39.73, 315/39.51, 39.65, 39.75
See application file for complete search history.

(56) References Cited

U.S. PATENT DOCUMENTS 4,465,953 A * 8/1984 Bekefi .................. 315/39.71

(Continued)

FOREIGN PATENT DOCUMENTS

WO        00/25455        5/2000

(Continued)

OTHER PUBLICATIONS

PCT/US03/27036; Annex to Form PCT/ISA/206 Communication Relating to the Results of the Partial International Search mailed Jan. 30, 2004.

*Primary Examiner*—Hanh Phan
(74) *Attorney, Agent, or Firm*—Renner, Otto, Boisselle and Sklar, LLP

(57) ABSTRACT

An optical communication system is provided which includes an optical signal transmitter which communicates high bandwidth, high power frequencies. The optical signal transmitter includes a high efficiency/high power optical source such as an optical magnetron or a phased array source of electromagnetic radiation, and a modulator element. The modulator element may be within a resonance cavity of the high efficiency/high power optical source (intra cavity) or external to the cavity (extra cavity). The modulator element serves to modulate output radiation of the high efficiency/high power optical source to produce a modulated high frequency optical signal which may be transmitted through the air. The optical signal transmitter is particularly useful in providing the last mile connection between cable service operators and end users.

23 Claims, 11 Drawing Sheets

U.S. PATENT DOCUMENTS

| | | | |
|---|---|---|---|
| 4,588,965 A * | 5/1986 | Cook | 331/91 |
| 5,676,873 A * | 10/1997 | Takase et al. | 219/761 |
| 5,786,923 A | 7/1998 | Doucet et al. | |
| 6,259,208 B1 * | 7/2001 | Crouch | 315/39.55 |
| 6,373,194 B1 * | 4/2002 | Small | 315/39.51 |
| 6,504,303 B2 * | 1/2003 | Small | 315/39.51 |
| 6,525,477 B2 * | 2/2003 | Small | 315/39.51 |
| 6,650,451 B1 * | 11/2003 | Byers et al. | 398/129 |
| 6,697,192 B1 * | 2/2004 | Fan et al. | 359/349 |
| 6,724,146 B2 * | 4/2004 | Small | 315/39.77 |
| 2002/0171897 A1 * | 11/2002 | Cho et al. | 359/172 |
| 2006/0097183 A1 * | 5/2006 | Baker et al. | 250/393 |

FOREIGN PATENT DOCUMENTS

WO            01/97250 A2     12/2001

* cited by examiner

WIRELESS COMMUNICATION SYSTEM WITH HIGH EFFICIENCY/HIGH POWER OPTICAL SOURCE

RELATED APPLICATION DATA

This application is a continuation-in-part of U.S. patent application Ser. No. 09/798,623, filed Mar. 1, 2001 now U.S. Pat. No. 6,504,303, which is a continuation-in-part of U.S. patent application Ser. No. 09/584,887, now U.S. Pat. No. 6,373,194, filed Jun. 1, 2000, U.S. patent application Ser. No. 10/050,744, filed Jan. 16, 2002, which is a divisional of U.S. patent application Ser. No. 09/584,887, and U.S. patent application Ser. No. 09/995,361, filed Nov. 27, 2001, all of which are hereby incorporated herein by reference in their entirety.

TECHNICAL FIELD

The present invention relates generally to wireless communication systems for communicating information, for example, video and voice data, and more particularly to a wireless optical communication system with a high efficiency/high power optical source.

BACKGROUND OF THE INVENTION

The need for network architectures that provide broad frequency bandwidth is evident from the increased user demand for programs, products and services such as high speed Internet access, voice-over-Internet protocol (VoIP), video-on-demand (VOD), interactive television, digital HDTV, and broadband telephony services such as videophone, videoconferencing, etc. Improvements to meet this need must deliver hundreds of Megabits per second, in send and receive modes, and preferably in duplex, i.e., simultaneously sending and receiving.

Cable companies, telecommunications companies, satellite and wireless providers, and other service providers have developed a number of methods to increase frequency bandwidth. For example, newer communication lines being built today are based on fiber optic technologies which are capable of transmitting large volumes of information at very high speeds (high-bit-rate data transmission). Most cities are linked by communication lines capable of carrying information such as video and voice data, requiring a high frequency bandwidth.

Little or no feasible technology presently exists, however, to deliver high frequency bandwidth, and in particular two-way bandwidth, at the user terminal end of existing communication networks. One reason for this is that the commonly referred to "last mile" local drop to the end user is typically still the legacy copper line installed decades ago for telephone service. Because the legacy copper lines were designed for performance that did not contemplate today's fiber optic capabilities, the end users with copper lines cannot avail themselves of the high bit rates that a modern long haul infrastructure can provide. Quite simply, the legacy links as well as the architecture of the central office (telephone exchange) cannot deliver the information transfer capability desired for all the data, video, etc. The end user has thus been limited by his or her local drop (or "last-mile") connection to the service provider.

Fiber optic cable lines and satellites may provide suitable transmission of high frequency communication signals, but these methods are not without drawbacks. For instance, laying cable lines to every end user is cost prohibitive, especially in an urban environment. Satellites, although capable of transmitting high frequency data, are limited due to both spectrum allocations and to a limited number of orbital slots; that is, there is insufficient capacity to deliver high bandwidth service to millions of users. Moreover, the complexities involved with high frequency two-way satellite bandwidth (duplex mode) render it too difficult and expensive to implement.

Short-wavelength optical systems also have been proposed, claiming optical data transmission with high bandwidth. Short-wavelength optical systems at near and visible frequencies, however, suffer from the inability to penetrate inclement weather such as clouds and rain.

In view of the aforementioned shortcomings associated with present communication and information networks, there exists a strong need for a communication system and method that can transmit and receive information with respect to the last-mile using a high frequency broadband carrier.

SUMMARY OF THE INVENTION

The present invention provides an optical communication system with an optical signal transmitter at the last mile for transmitting information at increased frequency bandwidths. The optical signal transmitter includes a high efficiency/high power optical source which operates at high efficiency, high power optical frequencies such as the infrared and visible light bands, and which may extend beyond into higher frequency bands such as ultraviolet, x-ray, etc. As a result, the communication system of the present invention may be used to solve the last mile problem exhibited in most existing communication networks. Moreover, the optical communication system is advantageous over conventional short-wavelength optical systems at near infrared and visible frequencies in its ability to penetrate clouds and rain.

According to one particular aspect of the invention, there is provided an optical communication system, including an optical signal communication station for communicating optical signals to an end user spaced from the optical signal communication station. The optical signal communication station includes a high efficiency/high power optical source which transmits high frequency optical communication through the air to the end user.

According to another aspect of the invention, there is provided a method of communicating high frequency optical signals through the air from an optical signal communication station to an end user. The method includes modulating an information signal with a high efficiency/high power optical source to obtain a high frequency optical signal, and transmitting the high frequency optical signal through the air to the end user.

According to another aspect of the invention, there is provided an optical communication system, including a service provider, and optical fiber network, and a high efficiency/high power optical source. The service provider receives information signals and converts the information signals into optical signals having a frequency in the broad bandwidth frequency range. The optical fiber network receives the optical signals from the service provider. The high efficiency/high power optical source receives the optical signals from the optical fiber network and transmits the optical signals through the air to an end user spaced from the high efficiency/high power optical source.

According to another aspect of the invention, there is provided an optical communication system, including an optical signal communication station which communicates through the air to one or more end users. The optical signal communication station includes a first optical signal receiver and a first high efficiency/high power optical source. The end user(s) are spaced from the optical signal communication station, and each end user includes a second optical signal receiver and a second high efficiency/high power optical source. The first high efficiency/high power optical source transmits through the air first optical signals having a frequency in the broad bandwidth frequency range, and the second optical signal receivers of the respective end users detects the first optical signals. The second high efficiency/ high power optical source transmits through the air second optical signals having a frequency in the broad bandwidth frequency range, and the first optical signal receiver of the optical signal communication station detects the second optical signals.

According to yet another aspect of the invention, there is provided an optical signal transmitter including a high efficiency/high power optical source and a modulator element. The high efficiency/high power optical source includes an anode, a cathode and an optical resonator. The anode, cathode and optical resonator are coaxially aligned and the anode and optical resonator are separated by a resonant cavity. The modulator element is disposed within the resonant cavity for modulating a high frequency optical signal of the high efficiency/high power optical source.

According to another aspect of the invention, there is provided an optical signal transmitter, including a high efficiency/high power optical source, a plurality of output waveguides and respective output antennas, and a plurality of high frequency modulator elements. The high efficiency/ high power optical source produces high frequency optical signals, and includes an optical resonator having a plurality of radially extending output ports through which the optical signals are transmitted. The plurality of output waveguides and respective output antennas are connected to and extend radially outwardly from the optical resonator at the respective output ports. Each of the plurality of high frequency modulator elements modulates the high frequency optical signal with an information signal to produce a modulated high frequency optical signal and directs the modulated optical signals toward a plurality of respective directions.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
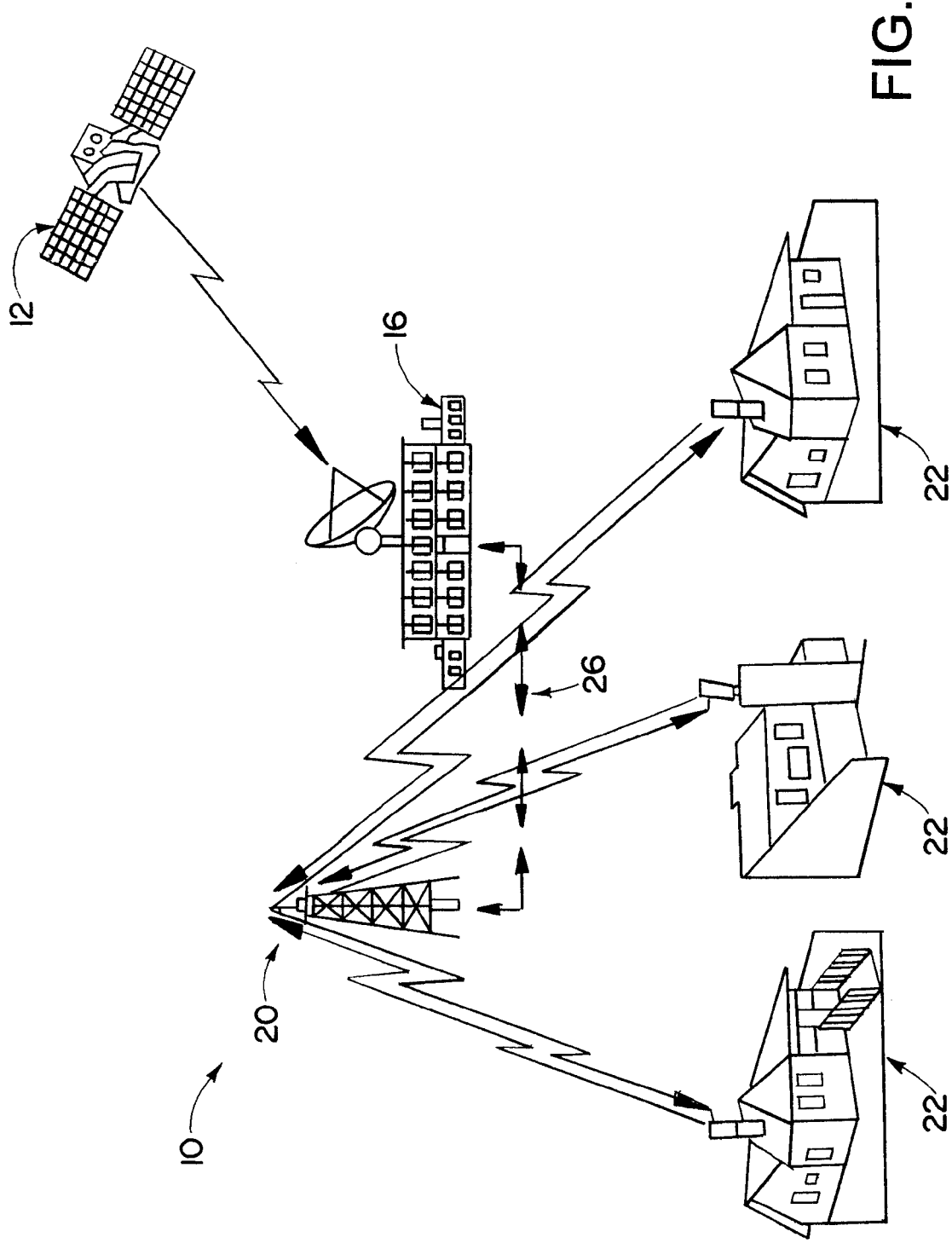
FIG. 1 is an environmental view illustrating an optical communication system in accordance with the present invention.

The present invention will now be described with reference to the drawings, in which like reference numerals are used to refer to like elements throughout.

Figure 2:
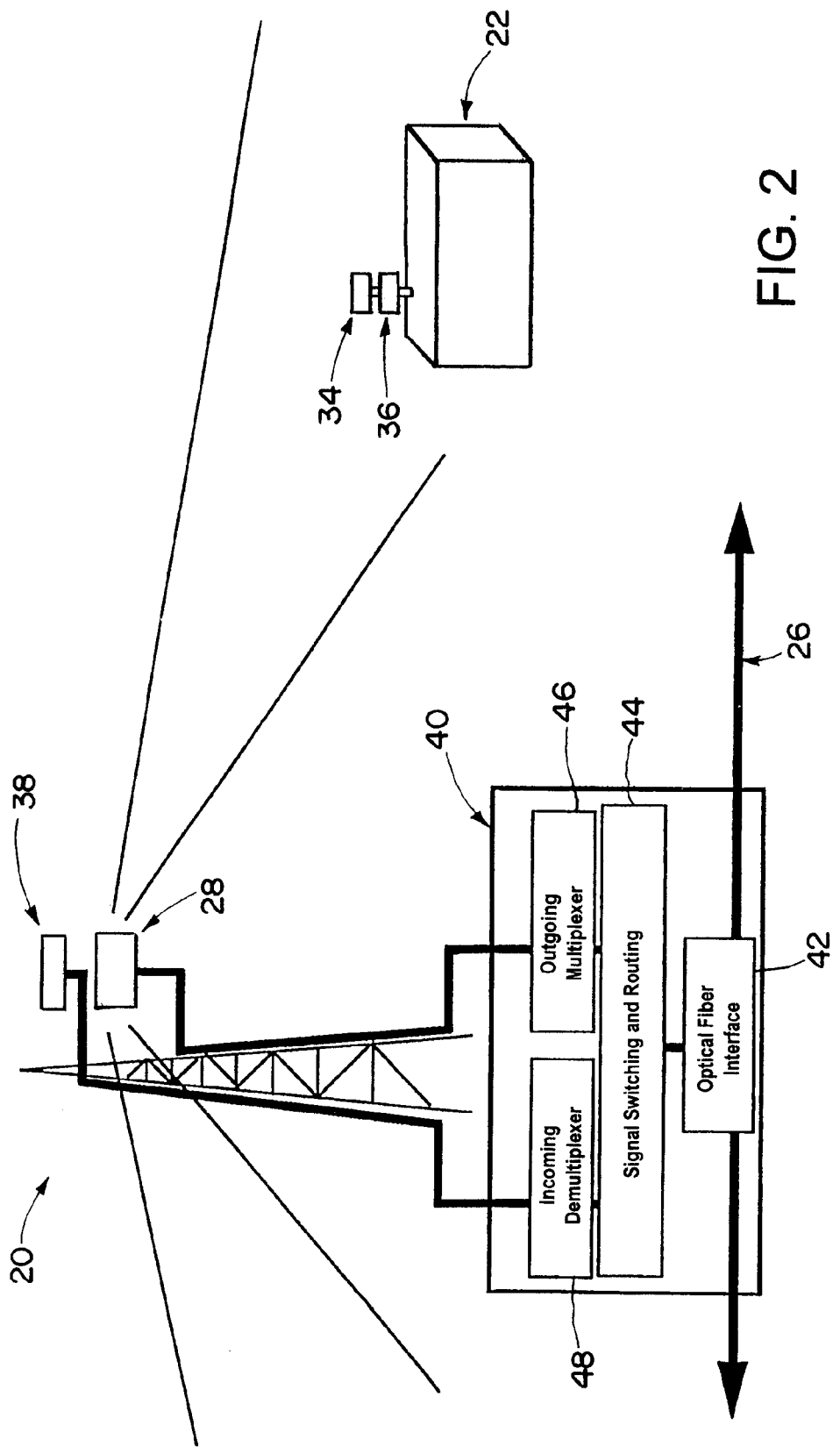
FIG. 2 is an environmental view illustrating in greater detail a neighborhood communication node and a neighborhood end user of the optical communication system of FIG. 1.

Referring now in detail to the drawings and initially to FIGS. 1 and 2, there is illustrated an optical communication system 10 in accordance with the present invention. The optical communication system 10 includes a broadband data source 12 such as a satellite, an intercity optical fiber trunk line, or the like. The data source 12 provides broadband data such as multichannel video programming, on-demand programming, broadband telecommunications, etc. The optical communication system 10 further includes a service provider 16 such as a cable service provider. The service provider 16 receives data from the data source 12 and provides such data to a network of optical signal communication stations 20, only one of which is shown in FIG. 1. The optical communication stations 20 serve to communicate information from the service provider 16 along the "last mile" to several associated neighborhood end users 22.

In accordance with the present invention, and as is described in greater detail below, the optical signal communication stations 20 and the corresponding neighborhood end users 22 are able to communicate at frequencies which exceed 100 Gigahertz. Information may thus be communicated through the air between the optical signal communication stations 20 and the neighborhood end users 22 at hundreds of Megabits per second in send and receive modes to enable, for example, video-on-demand (VOD), interactive television, and digital HDTV. Those of ordinary skill in the art will appreciate that the optical communication system 10 in accordance with the present invention may be used to solve the problem experienced by previously known communication systems insofar as the inability to efficiently deliver information requiring a high frequency bandwidth to a user terminal end of a communication network. The present invention efficiently solves such problem by enabling wireless communication of broad bandwidth communications to the neighborhood end users 22. The neighborhood end users 22 may be individual homes, an apartment unit or complex, condominiums, private business, etc., as will be appreciated.

In the exemplary embodiment, the broadband data source 12 is a satellite which transmits video and audio information, for example, such as cable television program services to the cable service provider 16. The cable service provider 16, in turn, frequency multiplexes the transmitted signal into a combined spectrum signal having a predetermined frequency distribution and then converts the combined spectrum signal into a broadband optical signal, for example. The cable service provider 16 transmits the broadband optical signal to the optical signal communication station 20 via an optical fiber network 26, such as a neighborhood trunk line as will be appreciated.

The illustrated optical signal communication station 20 includes a tower upon which an optical signal transmitter 28 is mounted. The optical signal transmitter 28 transmits the optical signal through the air to each neighborhood end user 22 in a corresponding cell or zone. Each neighborhood end user 22, in turn, includes an individual optical signal receiver 34 for receiving the optical signal. One or more demodulators (not shown) serve to demodulate the modulated high frequency optical signals transmitted by the optical signal transmitter 28 in order to reproduce the information signal, as will be appreciated by those of ordinary skill in the art.

Each neighborhood end user 22 optionally may include an optical signal transmitter 36, which transmits through the air an optical signal including data or other information to the optical signal communication station 20. In such case, the optical signal communication station 20 includes an optical signal receiver 38, which receives the optical signal from each end user 22 in the corresponding cell or zone. One or more demodulators (not shown) included in the optical signal receiver 38 serve to demodulate the modulated high frequency optical signals transmitted by the optical signal transmitter 36 in order to reproduce the information signal, as will be appreciated by those of ordinary skill in the art.

The optical signal transmitters 28 and 36 of the respective optical signal communication station 20 and the neighborhood end users 22 serve as high-efficiency sources of optical radiation which communicate information optically from the optical signal communication station 20 to the neighborhood end users 22 and vice versa.

As is shown in FIG. 2, the optical signal communication station 20 also includes a neighborhood communication node 40 which processes incoming and outgoing optical signals. The neighborhood communication node 40 is coupled to the optical fiber network 26 through an optical fiber interface 42. Optical signals incoming from the optical fiber network 26 are routed by a signal switching and routing device 44 to an outgoing multiplexer 46, which multiplexes the optical signal with respect to the neighborhood end users 22 before or as the optical signal is transmitted by the optical signal transmitter 28. Optical signals directed to the cable service provider 16, for example, optical signals carrying information requests for a particular program or service provided by the service provider 16, are transmitted to and demultiplexed by an incoming demultiplexer 48, before being routed by the signal switching and routing device 44 to the optical fiber network 26.

Figure 3:
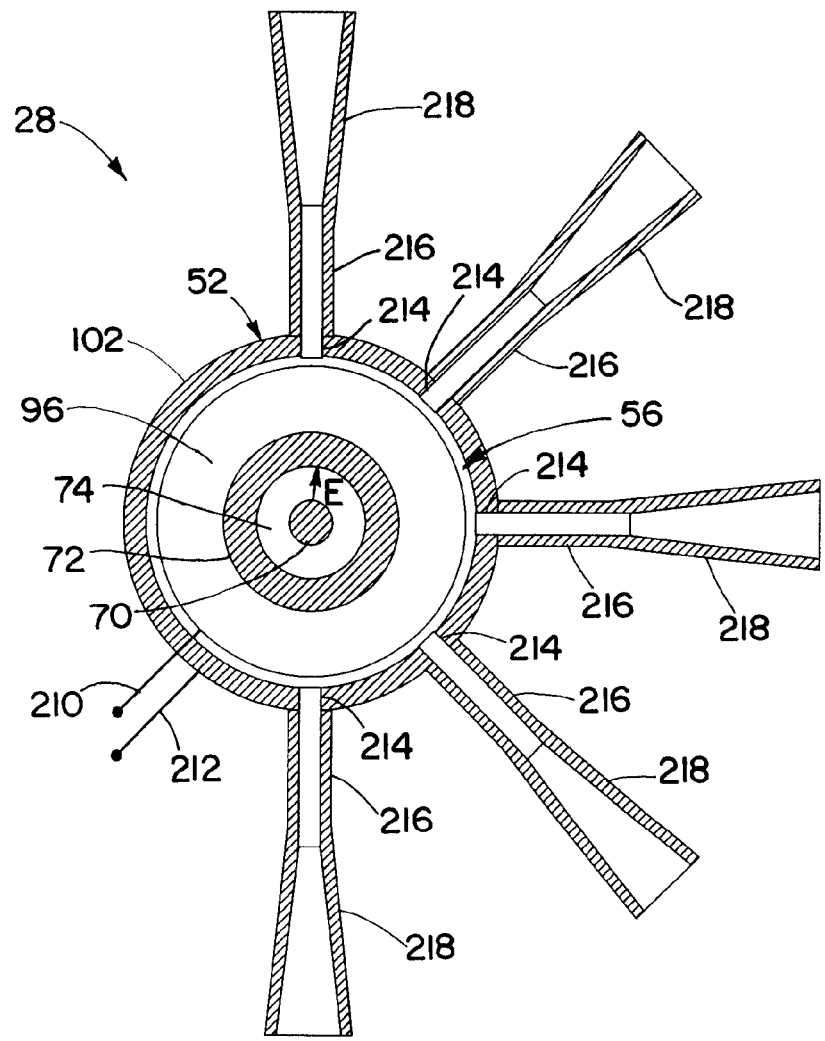
FIG. 3 is a cross-sectional top view of an optical signal transmitter in accordance with one embodiment of the present invention.
Figure 4:
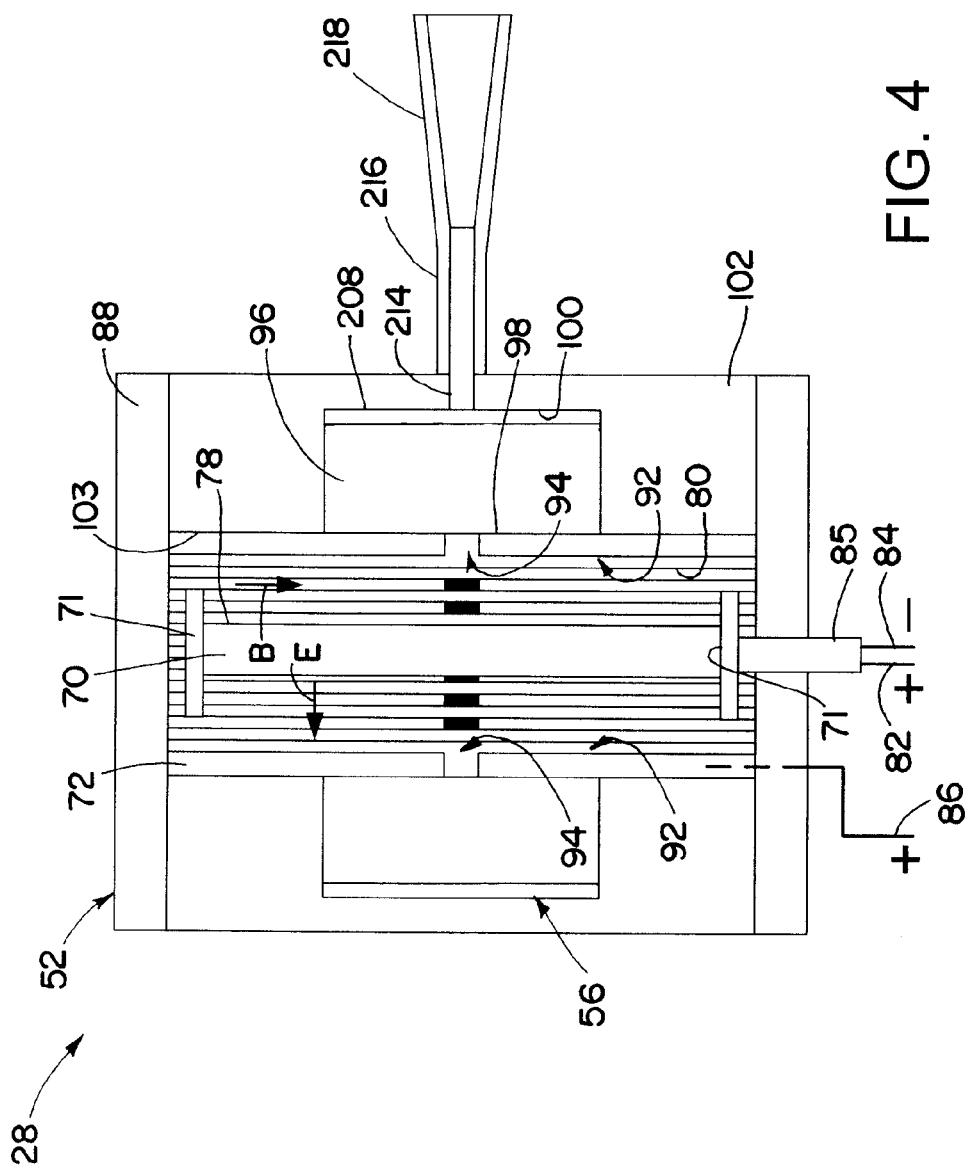
FIG. 4 is a cross-sectional view of the optical signal transmitter of FIG. 3 as viewed from line 4-4 in FIG. 3.

Turning now to FIGS. 3 and 4, a first embodiment of the optical signal transmitter 28 is shown. In the illustrated embodiment, the optical signal transmitter 36 is substantially the same as the optical signal transmitter 28, although the optical signal transmitter 36 typically will have only a single output. Therefore, the optical signal transmitter 36 will not be described for sake of brevity. Those of ordinary skill in the art will appreciate that the optical signal transmitter 28 alternatively may be of a different construction than that of the optical signal transmitter 36, and that the optical communication system 10 may embody several different optical signal transmitters depending on the frequencies and power requirements of the application involved.

The optical signal transmitter 28 includes a high efficiency/high power optical source such as the illustrated optical magnetron 52 which outputs high frequency optical radiation. A high speed modulator element 56 is included within the optical magnetron 52 which modulates the high frequency output radiation to produce a modulated high frequency optical signal. As is further described below, the optical magnetron 52 of the optical signal transmitter 28 is capable of operating at frequencies on the order of 100 GHz or more, enabling the optical signal transmitter 28 to transmit high bandwidth optical signals along the last mile between the optical signal transmitter 28 on the station 20 tower and the neighborhood end users 22.

The illustrated magnetron 52 includes a cylindrically shaped cathode 70 with endcaps 71 at the respective ends of the cathode 70. The cathode 70 is enclosed within a hollow-cylindrical shaped anode 72 which is aligned coaxially with the cathode 70. The anode 72 has an inner radius which is greater than the radius of the cathode 70 so as to define an interaction region or anode-cathode space 74 between an outer surface 78 of the cathode 70 and an inner surface 80 of the anode 72. Terminals 82 and 84 respectively pass through an insulator 85 and are electrically connected to the cathode 70 to supply power to heat the cathode 70 and also to supply a negative (−) high voltage to the cathode 70. The anode 72 is electrically connected to the positive (+) or ground terminal of a high voltage supply (not shown) via terminal 86. A pair of magnets 88 and 90 are located at the respective ends of the anode 72.

The inner surface 80 of the anode 72 includes a plurality of resonant cavities 92 distributed along the circumference within the anode 72, which are sized according to the desired operating frequency. Every other resonant cavity 92 includes a coupling port 94 which serves to couple energy from the respective resonant cavities 92 to a common resonant cavity 96. The coupling ports 94 are formed by holes or slots provided through the wall of the anode 72.

The common resonant cavity 96 is formed around the outer circumference of the anode 72, and is defined by the outer surface 98 of the anode 72 and a cavity defining wall 100 formed within a resonant cavity structure 102 such as the illustrated optical resonator. As is shown in FIG. 4, the optical resonator 102 forms a cylindrical sleeve 103 which fits around the anode 72. The common resonant cavity 96 is positioned so as to be aligned with the coupling ports 94 from the respective resonant cavities 92. The common resonant cavity 96 serves to constrain the plurality of resonant cavities 92 to operate in a pi-mode oscillation. That is, each resonant cavity 92 is constrained to oscillate pi-radians out of phase with the resonant cavities 92 immediately adjacent thereto.

During operation, a power supply (not shown) applies heater current to and from the cathode 70 via terminals 82 and 84. Simultaneously, power is applied as a dc voltage to the cathode 70 and anode 72 via terminals 84 and 86. The dc voltage produces a dc electric field E which extends radially between the cathode 70 and anode 72 throughout the anode-cathode space 74. The magnets 88 and 90 provide a dc magnetic field B in an axial direction which is normal to the electric field E throughout the anode-cathode space 74. The crossed magnetic field B and electric field E influence electrons emitted from the cathode 70 to move in curved paths through the anode-cathode space 74. With a sufficient dc magnetic field B, the electrons will not arrive at the anode 72, but return instead to the cathode 70. As the electrons emitted from the cathode 70 follow the curved paths through the anode-cathode space 74 and pass in close proximity to the openings of the resonant cavities 92, a resonant field is created within the resonant cavities 92. More specifically, the electrons emitted from the cathode 70 tend to form a rotating electron cloud which passes in close proximity to the resonant cavities 92. The electron cloud excites electromagnetic fields in the resonant cavities 92 causing them to oscillate or "ring". These persistent oscillatory fields in turn accelerate or decelerate passing electrons causing the electron cloud to bunch and form rotating spokes of charge.

The optical magnetron 52 is capable of operating at frequencies higher than 100 Ghz and with efficiencies on the order of 85%. Consequently, the illustrated optical magnetron 52 is well suited for the optical signal transmitter 28 requiring a high efficiency, high power output.

Figure 6:
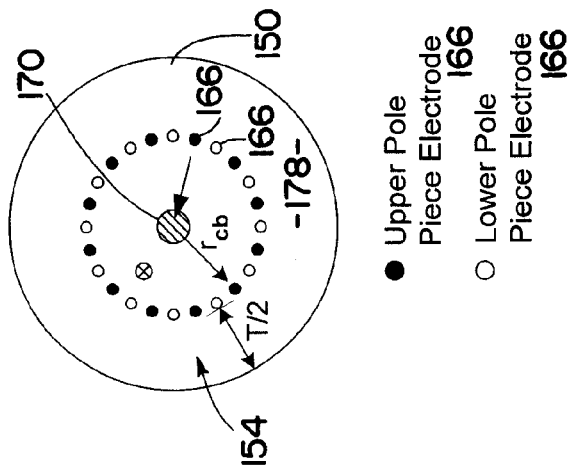
FIG. 6 is a cross-sectional top view of the phaser of FIG. 5 as viewed from line 6-6 in FIG. 5.
Figure 5:
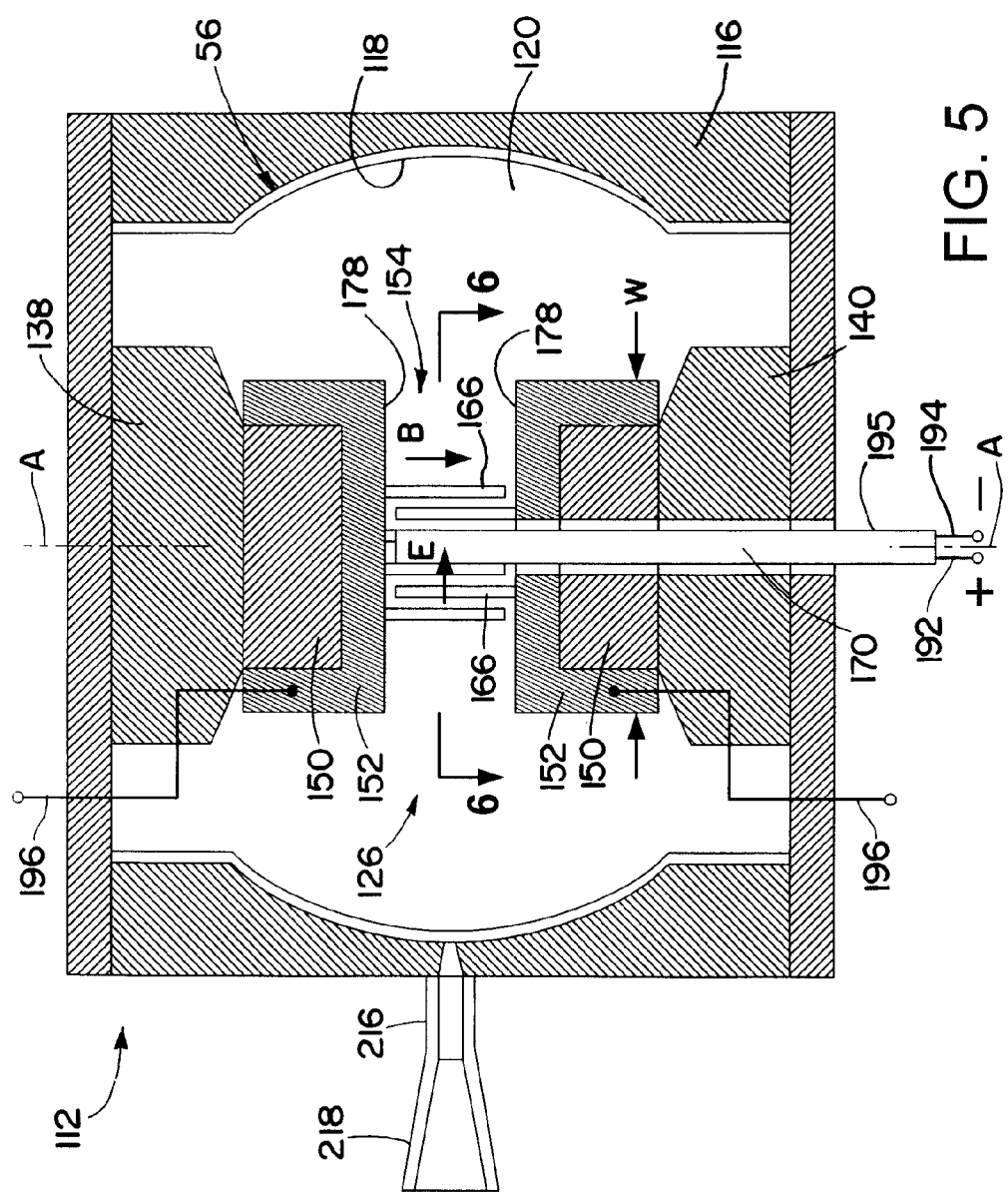
FIG. 5 is a cross-sectional side view of a phaser for use in the optical signal transmitter of FIG. 3.

Of course, other high efficiency/high power optical sources may alternatively be employed in the optical signal transmitter 28 to obtain similar operating frequencies and efficiencies, and such alternatives are contemplated by the present invention. For example, FIGS. 5 and 6 illustrate a phased array source of electromagnetic radiation (phaser) 112 in accordance with the present invention. In the Figures, like components are designated by like reference numerals. The phaser 112 has a different optical resonator and anode structure than that of the optical magnetron 52. The optical resonator 116, that is the resonant cavity structure, has a cavity defining wall 118 that is curved and forms a toroidal shaped common resonant cavity 120. As is described in further detail below, the anode 126 includes a plurality of interdigitated electrodes which permit very fine electrode spacing independent of the operating wavelength.

As is shown in FIGS. 5 and 6, the phaser 112 includes permanent magnets 138 and 140 and a corresponding cylindrical pole piece 150 mounted concentrically about the axis A on each of the magnets 138 and 140. Each of the pole pieces 150 includes a smooth, highly electrically conductive cladding 152 made of silver or the like. The pole pieces 150 are generally symmetric and face each other as shown in FIGS. 5 and 6. The width W of the pole pieces 150 and corresponding cladding 152 defines a relatively wide anode-cathode space 154 therebetween. Each pole piece 150 includes a plurality of electrodes 166 equally spaced about the circumference of a circle with a radius rcb (FIG. 6) from the axis A. The electrodes 166 have a length of $\frac{1}{4}\lambda$, where $\lambda$ is the wavelength at the desired operating frequency. The electrodes 166 from the upper pole piece 150 are interdigitated with the electrodes 166 of the lower pole piece 150 as shown in FIG. 5 such that a cylindrical "cage" is formed about the cathode 170 in the anode-cathode space 154 defined between the respective pole pieces 150. The radial distance from the electrodes 166 to the outer edge of the pole pieces 150 (inclusive of the cladding 152) is $\lambda/2$, and the spacing between the opposing faces 178 of the pole pieces 150 is slightly greater than $\lambda/4$ (to avoid electrode contact with the oppositely facing pole piece 150). As a result, the opposing faces 178 of the pole pieces 150 form a waveguide or parallel plate transmission line having a length along the radial direction of $\lambda/2$ which begins at the edge of the cylindrical cage formed by the electrodes 166 and opens into the common resonant cavity 120.

The cathode 170 extends along the axis A (e.g., through the lower magnet 140 and the pole piece 150) so as to be centered within the cage formed by the interdigital electrodes 166. Terminals 192 and 194 respectively pass through an insulator 195 and are electrically connected to the cathode 170 to supply power to heat the cathode 170 and also to supply a negative (−) high voltage to the cathode 170. The respective pole pieces 150 in this embodiment are electrically connected to the positive (+) or ground terminal of a high voltage supply (not shown) via terminal 196.

During operation, standing-wave electromagnetic fields cause the face 178 and electrodes 166 of the upper pole piece 150 to be charged negatively while the face 178 and electrodes 166 of the lower pole piece 150 are charged positively. The resultant alternating positively and negatively charged interdigital electrodes 166 cause horizontal electric fields to exist in the gaps between the electrodes 166. As the standing-wave field reverses in time during the cycle of oscillation, the face 178 and electrodes 166 of the upper pole piece 150 become positively charged while the face 178 and electrodes 166 of the lower pole piece 150 become negatively charged. The horizontal electric fields between the electrodes 166 thus reverse in direction during each cycle. These horizontal electric fields thus become the pi-mode fields which interact with the rotating electron cloud within the anode-cathode space to produce oscillations within the phaser 112.

It is noted that the phaser 112 of FIGS. 5 and 6 may be utilized in place of the optical magnetron of FIGS. 3 and 4 in each of the herein described embodiments.

Further details of the illustrated optical magnetron 52 and phaser 112 and other suitable high efficiency/high power optical sources for use in the optical signal transmitter 28 may be found, for example, in U.S. patent application Ser. Nos. 10/050,744, 09/995,361, 09/798,623, and 09/584,887 (now U.S. Pat. No. 6,373,194), and published PCT Application No. PCT/US01/16622, the subject matter of which is assigned to the assignee of the present invention, and which are hereby incorporated herein by reference in their entirety.

Referring again to FIGS. 3 and 4, the high speed modulator element 56 is disposed within the common resonant cavity 96 of the optical signal transmitter 28. The illustrated modulator element 56 is made of a suitable layer of electro optic material such as lithium niobate and has a hollow-cylindrical shaped structure which is aligned coaxially with the cathode 70 and anode 72. The outer circumference 208 of the modulator element 56 abuts the cavity defining wall 100 formed within the optical resonator 102. The data input terminals 210 and 212 are electrically connected to optically transparent electrodes (not shown) on opposite sides of the layer of electro optic material to supply a digital modulating signal to the modulator element 56.

During operation of the optical signal transmitter 28, a modulating voltage is applied to the data input terminals 210 and 212 of the modulating element 56 by the outgoing multiplexer 46. As a result of such modulating voltage, the dielectric constant of the modulating element 56 changes, for example. The change in the dielectric constant causes the optical magnetron 52 to shift its frequency, phase and/or amplitude, for example, thereby modulating the optical radiation transmitted by the optical magnetron 52. For example, the optical signal transmitter 28 in accordance with the present invention transmits data at a rate of up to about 10 gigabits per second.

The modulated optical signals are transmitted through a plurality of output ports 214. The output ports 214 are formed by holes or slots provided through the wall of the optical resonator 102. In the illustrated embodiment, the optical signal transmitter 28 includes a plurality of output waveguides 216 and respective output antennas 218 (such as a horn antenna or other suitable antenna) suitably connected to and extending radially outwardly from the optical magnetron 52 at the respective output ports 214. The output waveguides 216 and output horn antennas 218 direct the output signals toward a plurality of selected directions, for example, an output directed to each of the plurality of neighborhood end users 22. In the embodiment illustrated in FIGS. 3 and 4, all of the output signals emitted from the horn antennas 218 carry the same data stream. This data stream may be multiplexed (e.g., time-division, frequency division, etc.) in order that each neighborhood end user 22 receives select programming specific to the neighborhood end user 22.

As will be appreciated by those of ordinary skill in the art, the optical signal transmitter 28 may include any number of output waveguides and respective output antennas, and any such number is contemplated as falling within the scope of the present invention. It also will be appreciated that other types of modulators may be employed alternative to the electro optic type modulator. For example, switching diodes may be used to alternately open or short-circuit short lengths of waveguide, thereby producing phase shifts in the passing microwave radiation. Micromachined mechanical switches are also a suitable alternative, as they can be used in phase shift modulators at frequencies above 10 gigabits per second.

Figure 7:
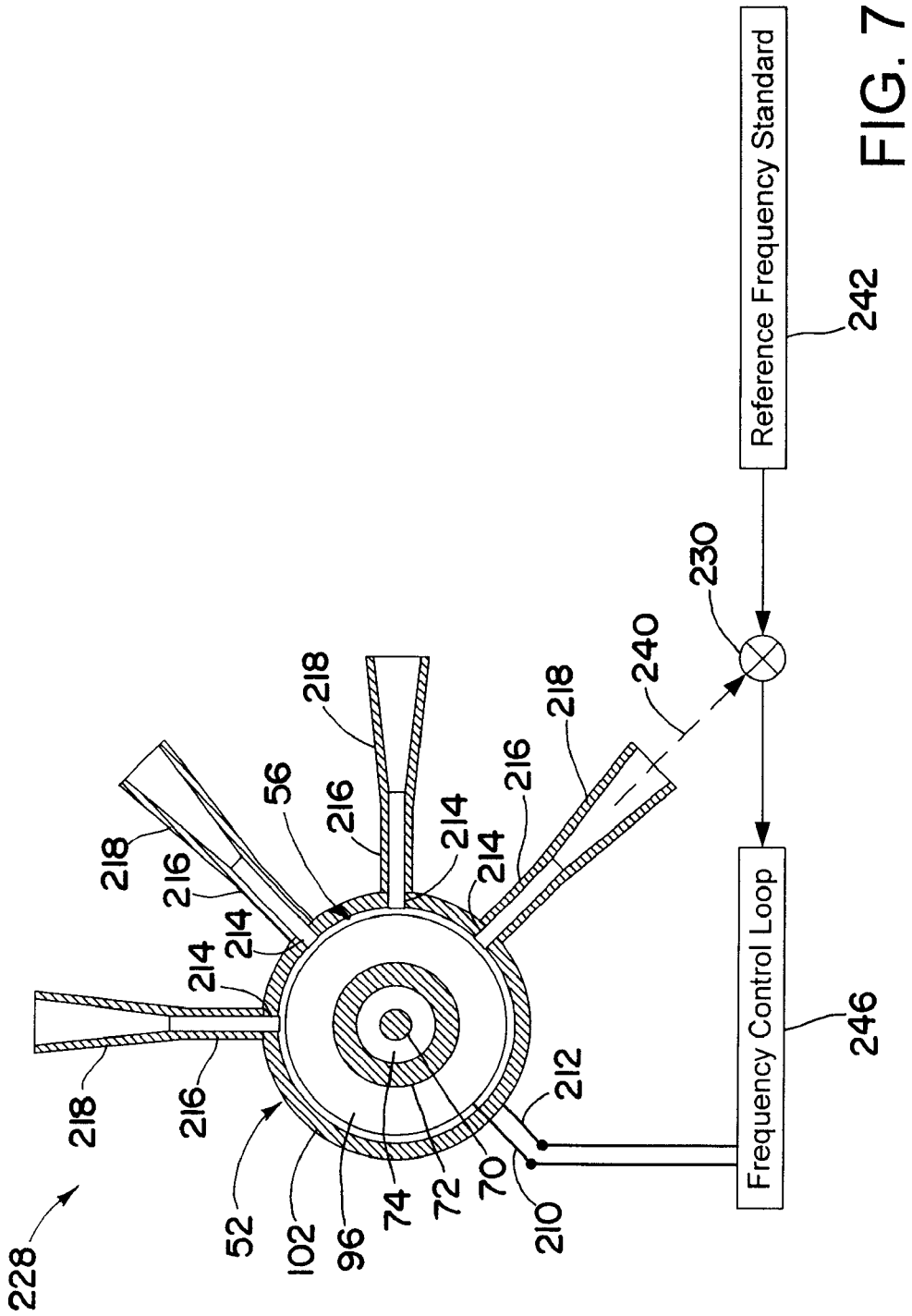
FIG. 7 is a cross-sectional top view of an optical signal transmitter in accordance with another embodiment of the present invention, including a mixer element.

FIG. 7 illustrates an optical signal transmitter 228 in accordance with another embodiment of the present invention. The optical signal transmitter 228 is essentially the same as the optical signal transmitter 28 described in reference to FIGS. 3 and 4 except that the optical signal transmitter 228 provides for frequency stabilization of the optical magnetron 52. In the Figures, like components are designated by like reference numerals.

As is illustrated in FIG. 7, the optical signal transmitter 228 includes a mixer element 230. During operation of the optical signal transmitter 228, the frequency or phase of the output radiation as detected from one of the output horn antennas 218 is compared via the mixer element 230 to a reference frequency standard 242 to detect any undesirable instability or drifting in the output frequency or output phase. To correct such differences in the frequency or phase, error voltages are applied to the modulation element 56 through a frequency control loop 246 and via the data input terminals 210 and 212.

Figure 8:
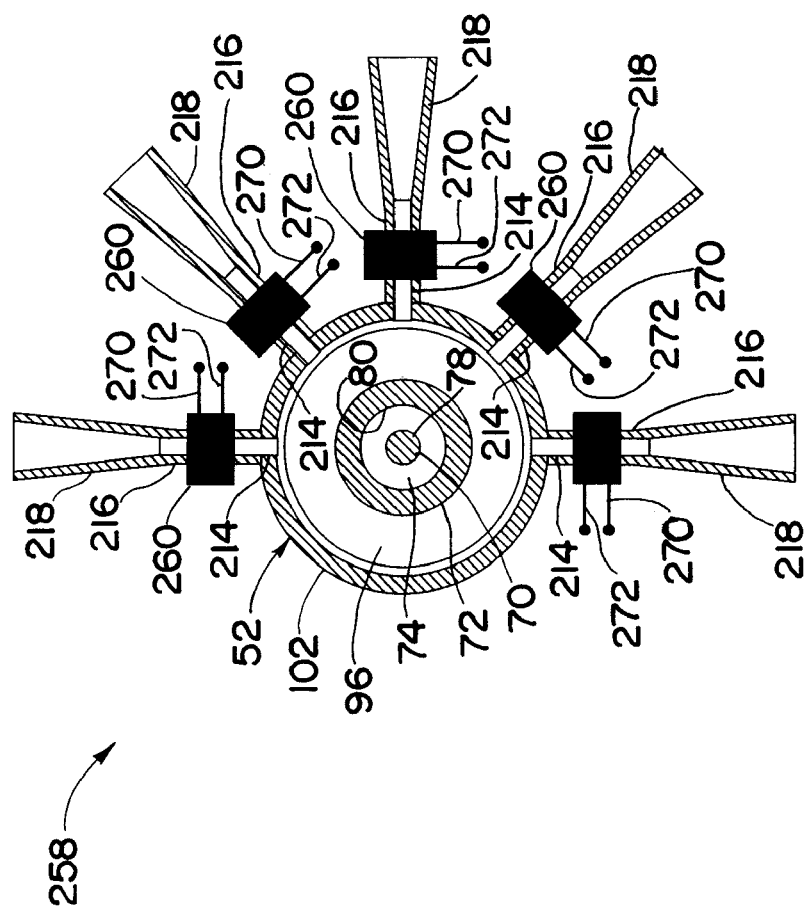
FIG. 8 is a cross-sectional top view of an optical signal transmitter in accordance with another embodiment of the present invention.
Figure 9:
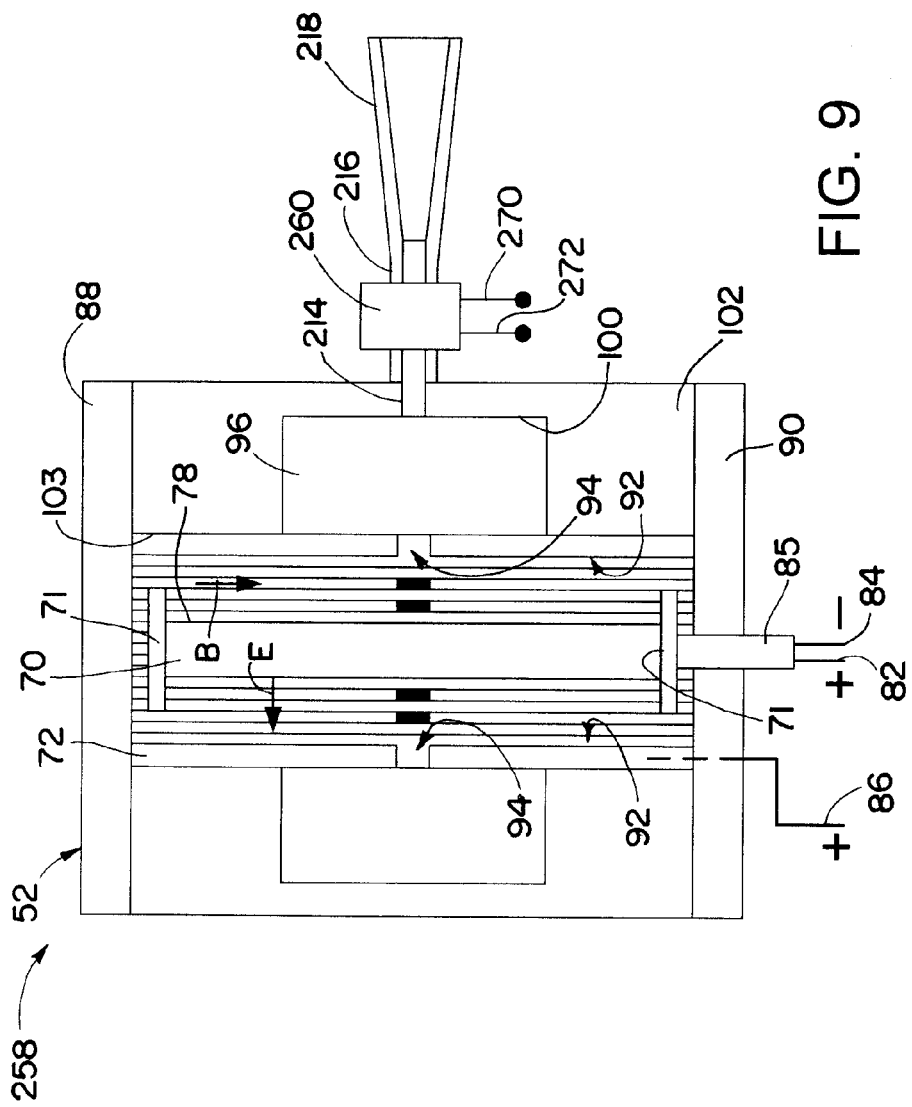
FIG. 9 is a cross-sectional view of the optical signal transmitter of FIG. 8 as viewed from line 9-9 in FIG. 8.

FIGS. 8 and 9 illustrate an optical signal transmitter 258 in accordance with another embodiment of the present invention. The optical signal transmitter 258 is essentially the same as the optical signal transmitter 28 described in reference to FIGS. 3 and 4 except that the optical signal transmitter 258 does not include an intra cavity modulator element 56 but rather a plurality of extra-cavity modulator elements 260. In the Figures, like components are designated by like reference numerals.

As is illustrated in FIGS. 8 and 9, each output waveguide 216 of the optical signal transmitter 258 is provided with a high speed modulator element 260. More particularly, each output waveguide 216 has a modulator element 260 in line with the optical radiation path defined by the output waveguide 216. For example, each modulator element 260 may be made up of a window (not shown) of electro optic material such as lithium niobate with electrodes disposed along the sides of the material. In this regard, the modulator may be placed within a waveguide and modulated by electrodes which produce electric fields across the diameter of the waveguide. Data input terminals 270 and 272 are electrically connected to the electrodes of each modulator element 260 to supply a digital modulation signal thereto.

Independent data streams may be applied to each modulator element 260 via the outgoing multiplexer 46 so that output radiation transmitted through one output waveguide 216 may be modulated in a manner independent of the output radiation transmitted through another output waveguide 216. Again, therefore, select programming may be delivered to each of the respective neighborhood end users 22. One of ordinary skill in the art will appreciate that adjacent output antennas 218 of the optical signal transmitter 258 may be cross polarized to avoid interference between nearby optical beam transmissions.

It further will be appreciated that the independent modulator elements 260 enable use of the entire frequency spectrum of the optical magnetron 52 to each neighborhood end user 22. The data delivery rate to each neighborhood end user 22 may thus be substantially increased. For example, for an optical signal transmitter 258 having up to about 10 output antennas 218, the optical signal transmitter 258 transmits data at a rate of up to about 50 gigabits per second from each output antenna 218.

Also, in general, modulator elements are capable of operating at higher data rates when they are placed in a single mode output waveguide such as the optical waveguide 216 of the optical signal transmitter 258, than when they are placed, for example, in the resonant cavity structure 102. In this regard, modulation rates can be up to about half the output carrier frequency. For example, for an output frequency of 250 Ghz, the modulation rate could be as high as about 100 gigabits per second in each output waveguide 216.

As is well known to persons skilled in the art, for a given data link distance and size, increasing the data rate requires increased transmit power in direct proportion to the data rate. Very high transmission rates to large service areas, such as 100 gigabits per second to entire neighborhoods, requires relatively high power sources on the order of about hundreds of watts to kilowatts per output waveguide beam. Heretofore, sufficient power levels were not available at carrier frequencies above 100 Ghz. Indeed, conventional optical data links typically use milliwatts in tightly focused beams, and can only provide point-to-point service to a limited number of end users. The present invention addresses both the need for very high transmission rates and the need for high output power.

Figure 10:
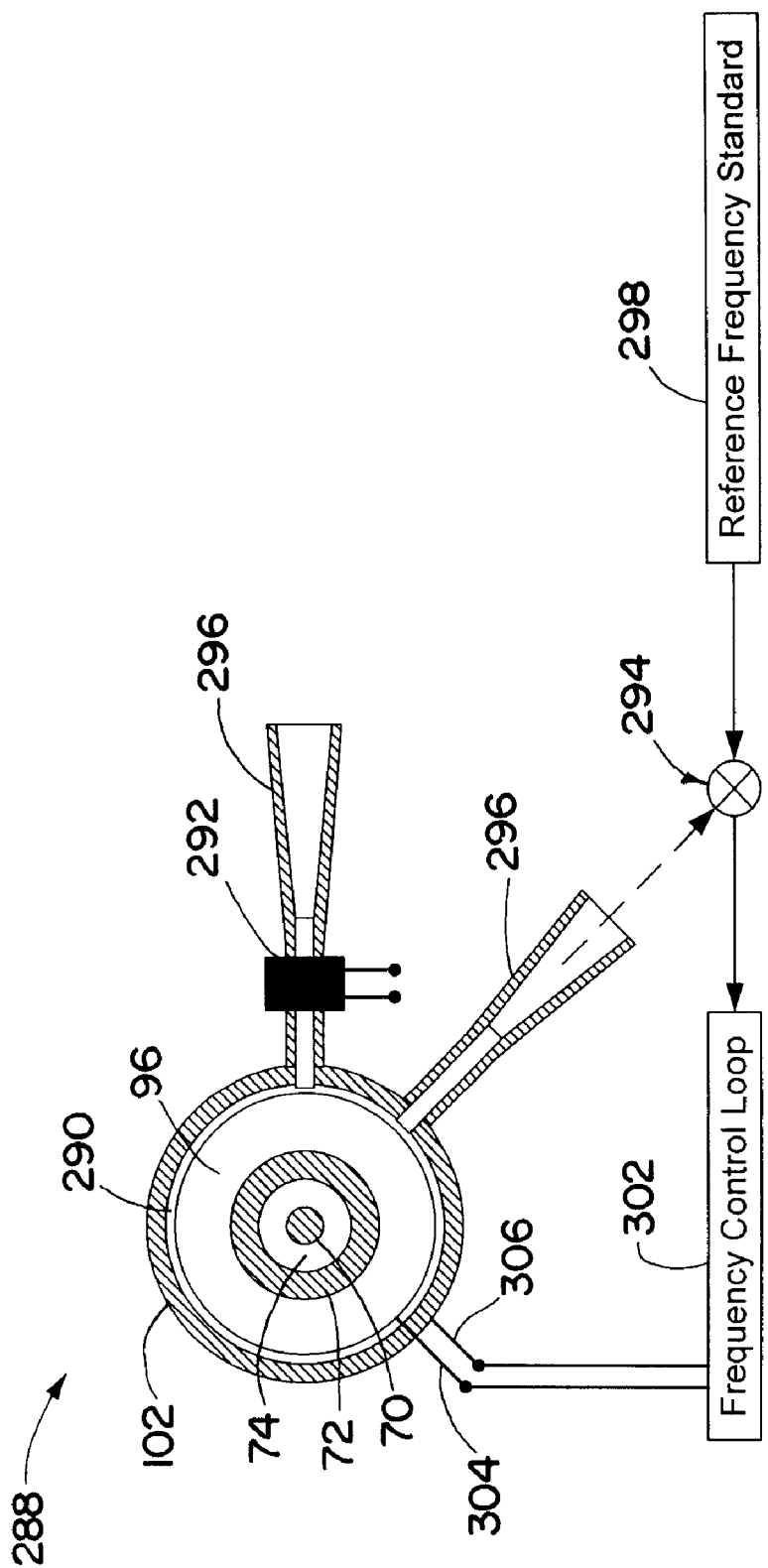
FIG. 10 is a cross-sectional top view of an optical signal transmitter in accordance with another embodiment of the present invention, including a mixer element.

FIG. 10 illustrates an optical signal transmitter 288 in accordance with yet another embodiment of the present invention. The optical signal transmitter 288 is essentially the same as the optical signal transmitter 258 described in reference to FIGS. 8 and 9 except that the optical signal transmitter 288 provides for frequency stabilization of the optical magnetron 52. In the Figures, like components are designated by like reference numerals.

As is illustrated in FIG. 10, the optical signal transmitter 288 includes an intra-cavity modulator element 290, an extra-cavity modulator element 292, and a mixer element 294. During operation of the optical signal transmitter 288, the frequency or phase of the output radiation as detected from one of the output horn antennas 296 is compared via the mixer element 294 to a reference frequency standard 298 to detect drifting in the output frequency or output phase. To correct such differences in the frequency or phase, error voltages are applied to the modulation element 290 through a frequency control loop 302 and via the data input terminals 304 and 306.

Figure 11:
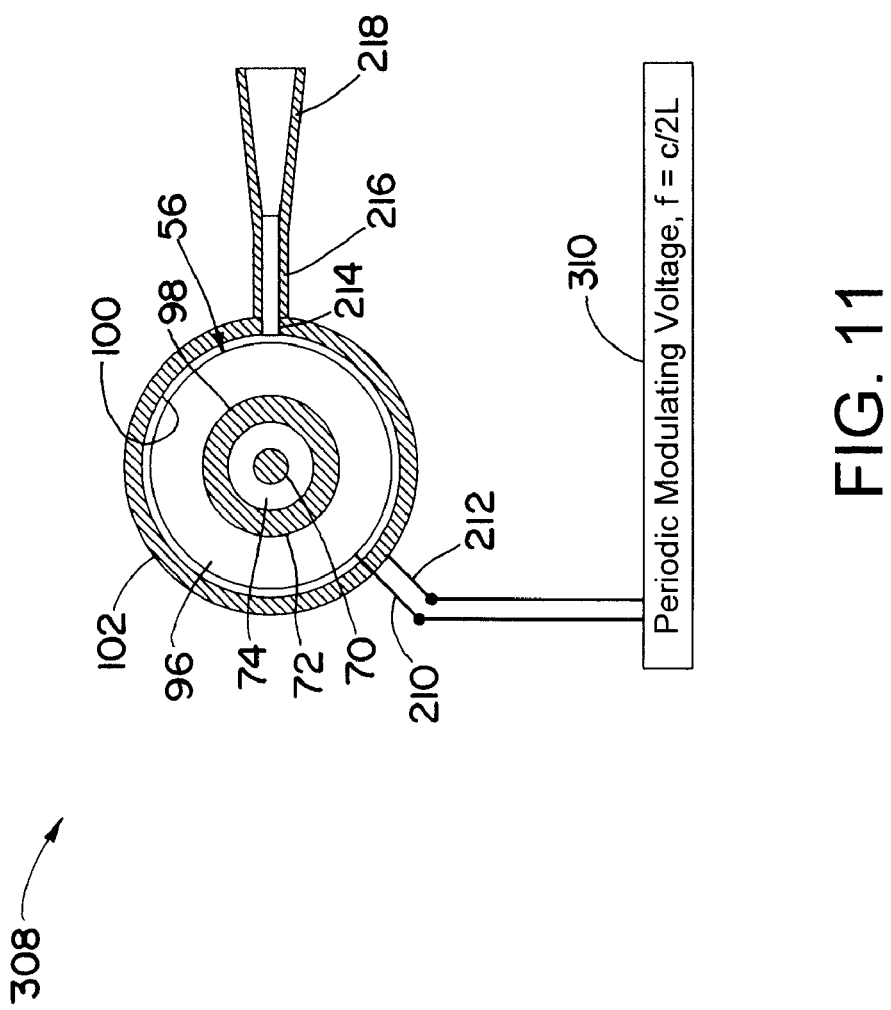
FIG. 11 is a cross-sectional top view of an optical signal transmitter in accordance with another embodiment of the present invention, including a mode locking device.

Referring now to FIG. 11, there is illustrated an optical signal transmitter 308 in accordance with yet another embodiment of the present invention. The optical signal transmitter 308 is essentially the same as the optical signal transmitter 28 described in reference to FIGS. 3 and 4 except that the optical signal transmitter 308 includes an intra-cavity mode locking device 310 which produces repetitive short-duration pulses of radiation with very high peak power. In the Figures, like components are designated by like reference numerals.

In FIG. 11, L is the resonator length between the outer surface 98 of the anode 72 and the inner surface of the optical resonator 102. The frequency F of the allowed modes of the optical resonator 102 are given approximately by $F=Nc/2L$, where c is the speed of light and N is the mode number. N is an integer which may range from one to several thousands, and is approximately equal to the number of half-wavelengths in the distance L for any particular operating wavelength. In general, a multiplicity of modes may oscillate simultaneously and independently. As L is made longer, more modes become possible within a given frequency interval. The frequency spacing between allowed modes is given approximately by $f=c/2L$.

Short pulse operation occurs when the independent N modes are coupled (or "locked") together. The optical magnetron 308 of the optical signal transmitter 308 may be mode-locked by applying a periodic input voltage to the data input terminals 210 and 212 connected to the high speed modulator element 56. When the period of the modulating voltage equals the period of the mode frequency spacing, locking occurs. In other words, mode locking occurs when the modulating frequency equals the frequency spacing between modes, $f=c/2L$.

Figure 12B:
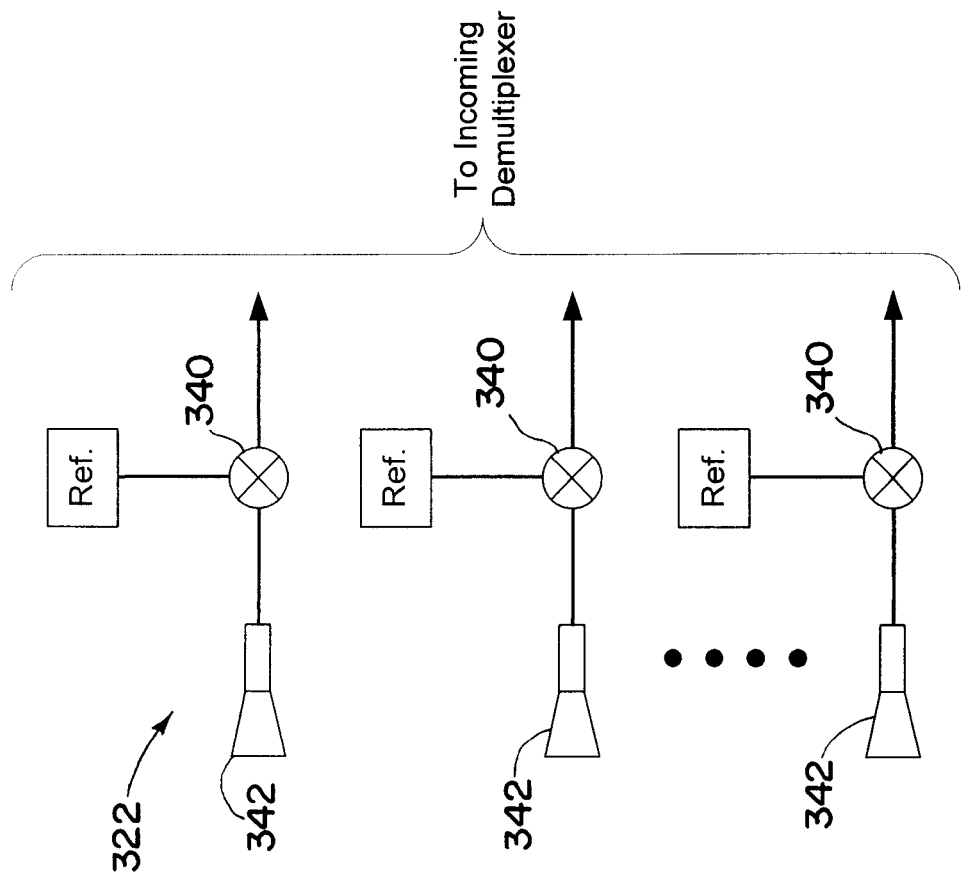
FIG. 12b is a cross-sectional top view of an optical signal receiver in accordance with another embodiment of the present invention.
Figure 12A:
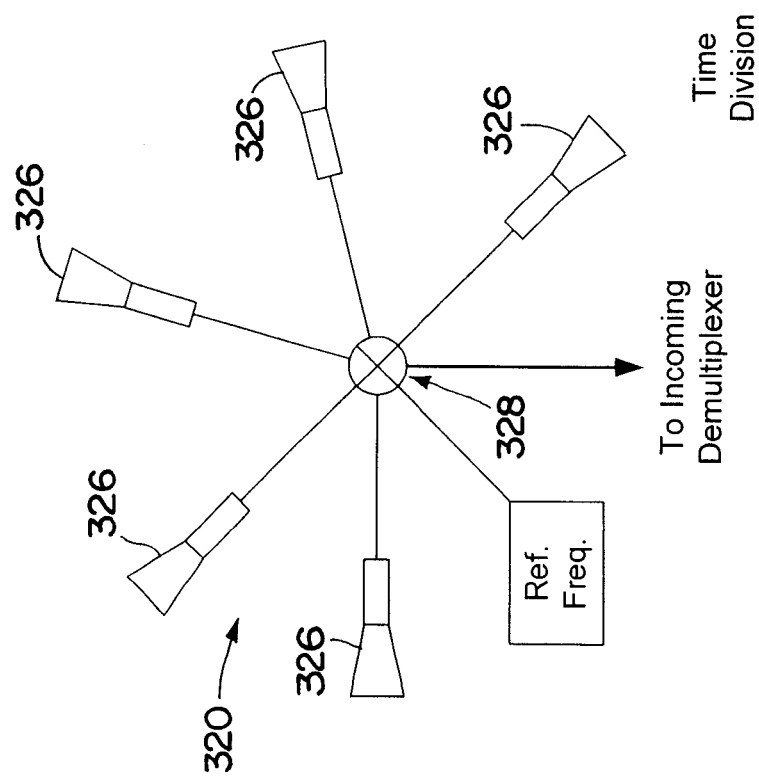
FIG. 12a is a cross-sectional top view of an optical signal receiver in accordance with the present invention.

Turning now to FIGS. 12a and 12b, there is shown two types of receivers 320 and 322 in accordance with the present invention. The receiver 320 includes multiple input horn antennas 326 and a single mixer element 328. The input horn antennas 326 receive optical communication signals from the respective neighborhood end users 22, for example. The mixer element 328 compares the frequency of the received signal with a reference frequency and generates an information data signal therefrom, for example a video or audio data signal. The data signal may then be routed to the incoming demultiplexer and further processed, for example, in the manner earlier described. The receiver 322 is similar to the receiver 320 except that there is a mixer element 340 associated with each input horn antenna 342. Accordingly, the mixer elements 340 provide independent reference frequencies with which optical signals from the respective end users 22 may be compared before or as the signals are transmitted to the incoming demultiplexer.

It will be appreciated that the optical signal transmitter of the present invention is suitable for operating at frequencies heretofore not possible with conventional microwave through-the-air transmitters. The optical signal transmitter of the present invention is capable of producing high efficiency, high power electromagnetic energy at frequencies within the infrared and visible light bands, and which may extend beyond into higher frequency bands such as ultra-violet, x-ray, etc.

Although the invention has been shown and described with respect to certain illustrated embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

The present invention includes all such equivalents and modifications, and is limited only by the scope of the following claims.

What is claimed is:

1. An optical communication system, comprising:
    a service provider which receives information signals and converts the information signals into optical signals having a frequency in the broad bandwidth frequency range;
    an optical fiber network which receives the optical signals from the service provider; and
    a high efficiency/high power optical source which receives the optical signals from the optical fiber network and transmits the optical signals through the air to an end user spaced from the high efficiency/high power optical source, the high efficiency/high power optical source comprising at least one of an optical magnetron or a phased array source of electromagnetic radiation, the optical magnetron or phased array source including a cathode, an anode spaced from the cathode, an interaction space between the anode and the cathode, and a magnetic field source, wherein the high efficiency/high power optical source includes an optical magnetron and one or more output waveguides and output antennas connected to the optical magnetron to direct the output signals toward one or more end users.

2. An optical communication system, comprising:
    a service provider which receives information signals and converts the information signals into optical signals having a frequency in the broad bandwidth frequency range;
    an optical fiber network which receives the optical signals from the service provider; and
    a high efficiency/high power optical source which receives the optical signals from the optical fiber network and transmits the optical signals through the air to an end user spaced from the high efficiency/high power optical source, the high efficiency/high power optical source comprising at least one of an optical magnetron or a phased array source of electromagnetic radiation, the optical magnetron or phased array source including a cathode, an anode spaced from the cathode, an interaction space between the anode and the cathode, and a magnetic field source, wherein the high efficiency/high power optical source includes a phased array source of electromagnetic radiation and one or more output waveguides and output antennas connected to the phased array source of electromagnetic radiation to direct the output signals toward one or more end users.

3. An optical communication system, comprising:
an optical signal communication station including a first optical signal receiver and a first high efficiency/high power optical source;
one or more end users spaced from the optical signal communication station, each end user including a second optical signal receiver and a second high efficiency/high power optical source;
wherein the first high efficiency/high power optical source transmits through the air first optical signals having a frequency in the broad bandwidth frequency range and one or more of the second optical signal receivers of the respective end users detects the first optical signals, and the second high efficiency/high power optical source transmits through the air second optical signals having a frequency in the broad bandwidth frequency range and the first optical signal receiver of the optical signal communication station detects the second optical signals, the first high efficiency/high power optical source comprising at least one of an optical magnetron or a phased array source of electromagnetic radiation, the optical magnetron or phased array source including a cathode, an anode spaced from the cathode, an interaction space between the anode and the cathode, and a magnetic field source, further comprising a modulator element disposed within a resonant cavity of an optical resonator for modulating a high frequency optical signal of the high efficiency/high power optical source.

4. The optical communication system of claim 3, wherein the modulator element includes a material having an electro optic effect to change the dielectric constant of the modulator element according to a modulated voltage applied to the modulator element.

5. The optical communication system of claim 4, wherein the material of the modulator element is lithium niobate.

6. The optical communication system of claim 3, further including a voltage generator for applying a voltage to the modulator element.

7. The optical communication system of claim 3, wherein the inner circumference of the optical resonator defines a cavity wall and wherein the outer circumference of the modulator element abuts the cavity wall.

8. The optical communication system of claim 3, wherein the optical resonator has a plurality of radially extending output ports through which the modulated optical signals are transmitted, and further including a plurality of output waveguides and respective output antennas connected to and extending radially outwardly from the optical resonator at the respective output ports which direct the modulated optical signals toward a plurality of directions.

9. The optical communication system of claim 3, further including a mixer element disposed relative to the modulator element to receive modulated high frequency signals therefrom, wherein the mixer element compares one or more of the output frequency and output phase of the modulated high frequency optical signal to a reference frequency standard to detect drifting in the output frequency or output phase.

10. The optical communication system of claim 3, further including a mode locking device which applies a periodic input voltage to data input terminals connected to the modulator element to lock a mode of the optical resonator.

11. The optical communication system of claim 10, wherein the frequency spacing between allowed modes of the optical resonator is defined by the equation $f=Nc/2L$, wherein N is the mode number, c is the speed of light and L is the radial distance between outer circumference of the anode and the inner circumference of the optical resonator.

12. The optical communication system of claim 11, wherein the optical resonator is mode locked when the period of the modulating voltage equals the period of the mode frequency spacing.

13. The optical communication system of claim 3, wherein the anode includes a plurality of interdigitated electrodes equally spaced apart circumferentially about a circle coaxially aligned with the cathode.

14. The optical communication system of claim 3, wherein the high efficiency/high power optical source includes an optical magnetron.

15. The optical communication system of claim 3, wherein the high efficiency/high power optical source includes a phased array source of electromagnetic radiation.

16. An optical signal transmitter, comprising:
a high efficiency/high power optical source which produces high frequency optical signals, the high efficiency/high power optical source including an optical resonator having a plurality of radially extending output ports through which the optical signals are transmitted;
a plurality of output waveguides and respective output antennas connected to and extending radially outwardly from the optical resonator at the respective output ports; and
a plurality of high frequency modulator elements, each of which modulates the high frequency optical signal with an information signal to produce a modulated high frequency optical signal and which directs the modulated optical signals toward a plurality of respective directions.

17. The optical signal transmitter of claim 16, wherein each modulator element includes a material having an electro optic effect to change the dielectric constant of the modulator element according to a modulated voltage applied to the modulator element.

18. The optical signal transmitter of claim 16, wherein each modulator element modulates the high frequency optical signal independently of other modulator elements.

19. The optical signal transmitter of claim 16, wherein for an output frequency of 250 Ghz, the modulation rate is about 100 gigabits per second in each output waveguide.

20. The optical signal transmitter of claim 16, wherein the high efficiency/high power optical source includes an anode and a cathode, and wherein the anode includes a plurality of interdigitated electrodes equally spaced apart circumferentially about a circle coaxially aligned with the cathode.

21. The optical signal transmitter of claim 16, wherein the high efficiency/high power optical source includes an optical magnetron.

22. The optical signal transmitter of claim 16, wherein the high efficiency/high power optical source includes a phased array source of electromagnetic radiation.

23. The optical signal transmitter of claim 16, wherein the output antenna includes an output horn antenna.

* * * * *